(No Model.)
M. MOYER.
DEVICE FOR HOLDING HORSES.
No. 559,861. Patented May 12, 1896.
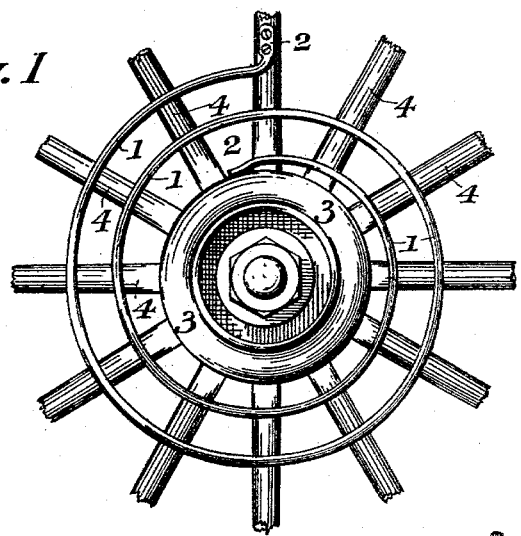
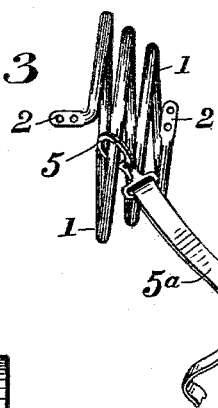
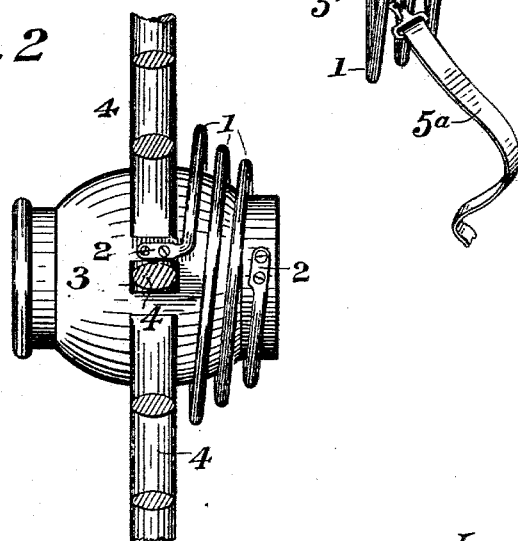
Witnesses:
W. H. Rowe
T. J. Klossowski
Inventor:
Moses Moyer.
By his Atty.
O. B. Reichelt

UNITED STATES PATENT OFFICE.

MOSES MOYER, OF TORONTO, CANADA.

DEVICE FOR HOLDING HORSES.

SPECIFICATION forming part of Letters Patent No. 559,861, dated May 12, 1896.

Application filed September 23, 1895. Serial No. 563,283. (No model.) Patented in Canada May 7, 1895, No. 48,863.

*To all whom it may concern:*

Be it known that I, MOSES MOYER, a citizen of the Dominion of Canada, and a resident of the city of Toronto, in the Province of Ontario and Dominion of Canada, have invented certain new and useful Improvements in Devices for Holding Horses, (for which I have obtained Letters Patent in Canada, No. 48,863, dated May 7, 1895,) of which the following is a specification.

My invention relates to an improved device for holding horses to vehicles, of which the following is a specification.

The object of my invention is to provide a light, simple, and effective device which may be attached to the vehicle and which will take the place of the weight which is at present used and which is not only heavy, but which may be easily lost, and, furthermore, to provide a device which will allow the horse to move backward without tension on the line attached to the bit, but which will act quickly against the animal's forward movement.

The invention consists of a spiral rod or rail secured to the wheel of the vehicle, to which the line or straps may be attached, as will be hereinafter fully described with reference to the accompanying drawings, wherein—

Figure 1 is a face view or elevation of the central part of a wheel provided with my invention; Fig. 2, an edge view thereof, showing a modification of my invention; and Fig. 3, a detail of the hitching-strap and holder detached.

The spiral 1 is made of a metal rod or rail, preferably of steel, curved in the form shown in Fig. 1, or it may be curved and formed into the conical spiral shown in Fig. 2. The ends of the rod 1 are flattened and adapted to be secured by nails, screws, or any suitable means to the hub 3, as shown by Fig. 2, or secured to the hub and to one of the spokes 4, as shown by Fig. 1. The ends 2 may also be attached to the hub or spoke by sharpening the ends and fastening them into the wood and also by attaching them in other ways. The spiral may be used in pairs right and left on the wheels and may be placed on the inside or outside part of the hub. In use the spring snap or hook 5 attached to the line $5^a$ is hooked over the outer coil of the spiral 1, and in the event of the animal moving forward the spiral 1 moves through the snap or hook until the outer end 2 comes in contact with the said hook. The snap and line are then carried down and rearward and the line will in this way be tightened and the animal checked. Should the animal move backward, the reverse movement of the wheel and spiral 1 thereon moves the hook toward the hub 3 as each successive inward coil of spiral 1 is passed through the hook, and it is evident that as many revolutions of the wheel as there are rounds or coils of the spiral 1 are allowed before there is any tension on the tie-line, thereby providing for reasonable backward movement of the animal without tension of the line or lines. Either the conical spiral or the plane spiral, formed as shown by Figs. 1 and 2, respectively, may be employed. Being attached or secured permanently to the vehicle-wheel, it is always available for its purpose, and because it is not cumbersome a driver will not through carelessness be liable to neglect to attach it to the spiral, and accidents are not as liable to occur, nor can it be lost or forgotten, and is always available when required and will be found particularly useful for butchers' and grocers' carts and other vehicles used as delivery-wagons.

Having described my invention, what I claim, and desire to secure by Letters Patent, is—

A vehicle-wheel having a spiral line-holder rod secured thereon at its inner and outer ends and encircling the hub, substantially as and for the purpose herein set forth.

In testimony that I claim the foregoing as my invention I have signed my name in the presence of two subscribing witnesses.

MOSES MOYER.

Witnesses:
GEO. BEAVERS,
O. S. MOYER.